(12) United States Patent
Hizi et al.

(10) Patent No.: US 9,848,137 B2
(45) Date of Patent: Dec. 19, 2017

(54) CMOS IMAGE SENSORS HAVING GRID ARRAY EXPOSURE CONTROL

(71) Applicant: Samsung Electronics Co., Ltd., Suwon-si, Gyeonggi-do (KR)

(72) Inventors: Uzi Hizi, Ramat Gan (IL); Nathan Henri Levy, Ramat Gan (IL); Mickey Bahar, Ramat Gan (IL)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 55 days.

(21) Appl. No.: 14/950,050

(22) Filed: Nov. 24, 2015

(65) Prior Publication Data

US 2017/0150076 A1    May 25, 2017

(51) Int. Cl.
*H04N 5/355* (2011.01)
*H04N 5/376* (2011.01)
*H04N 5/353* (2011.01)
*H04N 5/374* (2011.01)

(52) U.S. Cl.
CPC ....... *H04N 5/35554* (2013.01); *H04N 5/3532* (2013.01); *H04N 5/3535* (2013.01); *H04N 5/374* (2013.01); *H04N 5/3765* (2013.01)

(58) Field of Classification Search
CPC .... H04N 5/353; H04N 5/3532; H04N 5/3535; H04N 5/35554; H04N 5/3765
See application file for complete search history.

(56) References Cited

U.S. PATENT DOCUMENTS

| 9,554,059 | B1* | 1/2017 | Lin | H04N 5/35554 |
| 2008/0231730 | A1* | 9/2008 | Tsuruoka | H04N 5/235 348/229.1 |
| 2012/0218426 | A1* | 8/2012 | Kaizu | H04N 5/35554 348/208.4 |
| 2012/0281133 | A1* | 11/2012 | Kurita | H04N 5/23254 348/362 |
| 2014/0192250 | A1* | 7/2014 | Mitsunaga | H04N 5/3535 348/349 |
| 2014/0340553 | A1* | 11/2014 | Kuang | H04N 5/2355 348/302 |
| 2015/0009352 | A1* | 1/2015 | Shibagami | H04N 5/2355 348/218.1 |
| 2015/0244923 | A1* | 8/2015 | Lee | H04N 9/045 348/234 |
| 2016/0173751 | A1* | 6/2016 | Nakata | H04N 5/2355 348/362 |
| 2017/0064179 | A1* | 3/2017 | Richards | G06K 9/4642 |

\* cited by examiner

*Primary Examiner* — Daniel M Pasiewicz
(74) *Attorney, Agent, or Firm* — Harness, Dickey & Pierce, P.L.C.

(57) ABSTRACT

An image sensor includes a pixel array and a plurality of control circuits. The pixel array includes a plurality of sub-arrays arranged in a plurality of rows and columns, each of the plurality of sub-arrays including a plurality of pixels. The plurality of control circuits are coupled to the pixel array, and configured to control exposure of the plurality of sub-arrays. At least a first of the plurality of control circuits is configured to control exposure of a first of the plurality of sub-arrays according to a first set of exposure times. At least a second of the plurality of control circuits is configured to control exposure of a second of the plurality of sub-arrays according to a second set of exposure times. The first set of exposure times is different from the second set of exposure times.

14 Claims, 10 Drawing Sheets

FIG. 4

| | | | | 402 | | | | | |
|---|---|---|---|---|---|---|---|---|---|
| $EXP_1$ | $EXP_1$ | $EXP_1$ | $EXP_1$ | COMB | $EXP_3$ | $EXP_3$ | $EXP_3$ | $EXP_3$ | $EXP_3$ |
| $EXP_1$ | $EXP_1$ | $EXP_1$ | $EXP_1$ | COMB | $EXP_3$ | $EXP_3$ | $EXP_3$ | $EXP_3$ | $EXP_3$ |
| $EXP_1$ | $EXP_1$ | $EXP_1$ | $EXP_1$ | COMB | $EXP_3$ | $EXP_3$ | $EXP_3$ | $EXP_3$ | $EXP_3$ |
| $EXP_1$ | $EXP_1$ | $EXP_1$ | $EXP_1$ | $EXP_1$ | COMB | COMB | COMB | COMB | COMB |
| $EXP_1$ | $EXP_1$ | $EXP_1$ | $EXP_1$ | COMB | $EXP_4$ | $EXP_4$ | $EXP_4$ | $EXP_4$ | $EXP_4$ |
| COMB | COMB | COMB | $EXP_1$ | COMB | $EXP_4$ | $EXP_4$ | $EXP_4$ | $EXP_4$ | $EXP_4$ |
| $EXP_4$ | $EXP_4$ | $EXP_4$ | COMB | COMB | COMB | COMB | COMB | COMB | COMB |
| $EXP_4$ | $EXP_4$ | $EXP_4$ | COMB | $EXP_2$ | $EXP_2$ | $EXP_2$ | $EXP_2$ | $EXP_2$ | $EXP_2$ |
| $EXP_4$ | $EXP_4$ | $EXP_4$ | COMB | $EXP_2$ | $EXP_2$ | $EXP_2$ | $EXP_2$ | $EXP_2$ | $EXP_2$ |
| $EXP_4$ | $EXP_4$ | $EXP_4$ | COMB | $EXP_2$ | $EXP_2$ | $EXP_2$ | $EXP_2$ | $EXP_2$ | $EXP_2$ |

FIG. 9

| G | R | G | R | G | R |
|---|---|---|---|---|---|
| B | G | B | G | B | G |
| g | r | g | r | g | r |
| b | g | b | g | b | g |
| G | R | G | R | G | R |
| B | G | B | G | B | G |

Long

Short

Long

FIG. 10

CMOS IMAGE SENSORS HAVING GRID ARRAY EXPOSURE CONTROL

BACKGROUND

Conventional complementary metal-oxide semiconductor (CMOS) image sensors include pixel arrays that collect electric charge during exposure times (also referred to as exposure periods).

In some conventional CMOS image sensors, the pixel array is controlled by a single exposure time, which applies to the entire pixel array. In more advanced image sensors with wide dynamic range (WDR), the pixel array exposure time for the pixel array may be controlled according to a given pattern of exposure times.

FIG. 9 illustrates a WDR example in which a single long exposure time and a single short exposure time are applied to the pixel array alternately on a line-by-line basis. In this example, the exposure duration is changed from long to short and vice versa every two lines.

FIG. 10 illustrates another WDR example in which the long and short exposure times are applied in a mosaic pattern where each group of four pixels (referred to as a "quad pixel") changes from long to short and vice versa.

Each of the conventional approaches for controlling exposure of pixel arrays, however, forces image processing to set the proper long and short exposure time for the entire array, even though certain areas of the array may require different exposure times for increasing dynamic range depending on the scene being captured.

SUMMARY

One or more example embodiments provide methods for grid exposure control in which an image sensor array is divided into a plurality of sub-arrays (or sub-units), and each of the sub-arrays may be controlled with a different exposure time, set of exposure times, or sets of exposure times.

A timing circuit may calculate and set an exposure time (or set(s) of exposure times) for each sub-array of the pixel array independently of other sub-arrays in the pixel array such that the sub-arrays may be assigned different exposure times or set(s) of exposure times. One or more example embodiments may provide higher dynamic range images since areas of a pixel array may be calibrated to a more appropriate exposure time according to the scene (or portion thereof) being captured by a particular portion of the image sensor.

At least one example embodiment provides an image sensor. The image sensor includes a pixel array and a plurality of control circuits. The pixel array includes a plurality of sub-arrays arranged in a plurality of rows and columns, each of the plurality of sub-arrays including a plurality of pixels. The plurality of control circuits are coupled to the pixel array, and configured to control exposure of the plurality of sub-arrays. At least a first of the plurality of control circuits is configured to control exposure of a first of the plurality of sub-arrays according to a first set of exposure times. At least a second of the plurality of control circuits is configured to control exposure of a second of the plurality of sub-arrays according to a second set of exposure times. The first set of exposure times is different from the second set of exposure times.

According to at least some example embodiments, the first of the plurality of control circuits may be configured to control the first of the plurality of sub-arrays independently of the second of the plurality of sub-arrays and others of the plurality of sub-arrays.

The image sensor may further include a timing circuit configured to calculate the first set of exposure times based on a dynamic range of a corresponding portion of a scene to be captured by the first of the plurality of sub-arrays.

The first set of exposure times may include: a first subset of exposure times for short exposure pixels among the plurality of pixels of the first of the plurality of sub-arrays; and a second subset of exposure times for long exposure pixels among the plurality of pixels of the first of the plurality of sub-arrays.

The first of the plurality of control circuits may be configured to: control exposure of a first portion of the plurality of pixels of the first of the plurality of sub-arrays according to the first subset of exposure times; and control exposure of a second portion of the plurality of pixels of the first of the plurality of sub-arrays according to the second subset of exposure times.

The timing circuit may be further configured to: establish a set of exposure times for a plurality of grid points on the pixel array according to the dynamic range of the corresponding portion of the scene to be captured by the first of the plurality of sub-arrays; and calculate, for the first of the plurality of sub-arrays, the first set of exposure times based on the established set of exposure times for the plurality of grid points.

Each of the established set of exposure times may include a long exposure time and a short exposure time.

The plurality of grid points may be spaced apart from one another at regular intervals on the pixel array.

The timing circuit may be further configured to calculate the first set of exposure times for the first of the plurality of sub-arrays based on the established set of exposure times using interpolation. The interpolation may be linear interpolation.

The timing circuit may be further configured to calculate the first set of exposure times based on weighted values of exposure times among the established set of exposure times for the plurality of grid points.

The values of the exposure times among the established set of exposure times may be weighted based on distances between a center of the first of the plurality of sub-arrays and each of the plurality of grid points.

The image sensor may further include a line driver configured to generate a plurality of transfer pulses according to the first set of exposure times, the generated plurality of transfer pulses controlling exposure of the first of the plurality of sub-arrays.

At least one other example embodiment provides a digital imaging system including: a processor configured to execute computer-readable instructions to process captured image data; and an image sensor configured to capture the image data by converting optical images into electrical signals. The image sensor includes a pixel array and a plurality of control circuits. The pixel array includes a plurality of sub-arrays arranged in a plurality of rows and columns, each of the plurality of sub-arrays including a plurality of pixels. The plurality of control circuits are coupled to the pixel array, and configured to control exposure of the plurality of sub-arrays. At least a first of the plurality of control circuits is configured to control exposure of a first of the plurality of sub-arrays according to a first set of exposure times. At least a second of the plurality of control circuits is configured to control exposure of a second of the plurality of sub-arrays according to a second set of exposure times. The first set of exposure times is different from the second set of exposure times.

At least one other example embodiment provides an image sensor including a pixel array and a timing circuit. The pixel array includes a plurality of sub-arrays arranged in a plurality of rows and columns, each of the plurality of sub-arrays including a plurality of pixels, and each of the plurality of sub-arrays corresponding to a portion of a scene to be captured by the image sensor. The timing circuit is configured to: generate a first set of exposure times for a first of the plurality of sub-arrays based on a dynamic range of a first portion of the scene to be captured by the first of the plurality of sub-arrays; and generate a second set of exposure times for a second of the plurality of sub-arrays based on a dynamic range of a second portion of the scene to be captured by the second of the plurality of sub-arrays. The generated first and second sets of exposure times are different.

The first set of exposure times may include: a first subset of exposure times for short exposure pixels among the plurality of pixels of the first of the plurality of sub-arrays; and a second subset of exposure times for long exposure pixels among the plurality of pixels of the first of the plurality of sub-arrays.

The timing circuit may be further configured to: establish a set of exposure times for each of a plurality of grid points on the pixel array according to the dynamic range of the first portion of the scene to be captured by the first of the plurality of sub-arrays; and generate the first set of exposure times based on the established set of exposure times for the plurality of grid points.

The timing circuit may be further configured to generate the first set of exposure times for the first of the plurality of sub-arrays based on the established set of exposure times using interpolation.

The timing circuit may be further configured to generate the first set of exposure times based on weighted values of exposure times among the established set of exposure times for the plurality of grid points.

The values of the exposure times among the established set of exposure times for the plurality of grid points are weighted based on distances between a center of the first of the plurality of sub-arrays and each of the plurality of grid points.

BRIEF DESCRIPTION OF THE DRAWINGS

Example embodiments will become more appreciable through the description of the drawings in which:

FIG. 4 illustrates a simplified example in which the pixel array is divided into sub-arrays of 32×32 pixels.

FIGS. 9 and 10 illustrate conventional wide dynamic range (WDR) examples.

DETAILED DESCRIPTION

Figure 1:
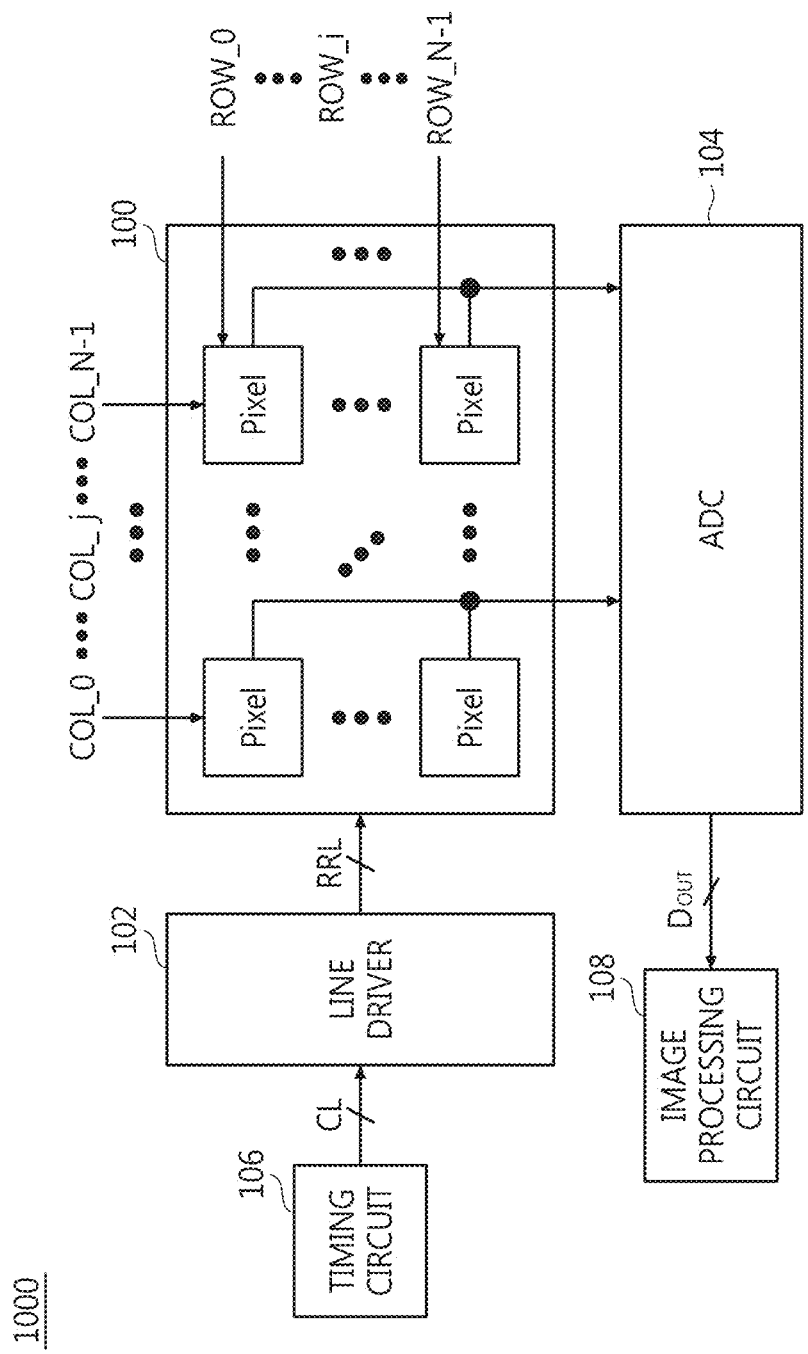
FIG. 1 is a block diagram illustrating an example embodiment of an image sensor.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure is illustrated in a cross-sectional view, an electronic device may include a plurality of the device structures, as would be illustrated by a plan view of the electronic device. The plurality of device structures may be arranged in an array and/or in a two-dimensional pattern.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include processing circuitry, such as one or more Central Processing Units (CPUs), digital signal processors (DSPs), application-specific-integrated-circuits (ASICs), field programmable gate arrays (FPGAs), computers, or the like. The processing circuitry may be configured to carry out program code by performing arithmetical, logical, and input/output operations. In one example, once the program code is loaded into processing circuitry including one or more processors, the one or more processors may be programmed to perform the program code, thereby transforming the one or more processors into special purpose processor(s) or processing circuitry.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc., may be passed, forwarded, or transmitted via any suitable means including memory sharing, message passing, token passing, network transmission, etc.

One or more example embodiments provide methods, devices, and/or computer-readable storage mediums, for generating images. For example, one or more example embodiments provide methods for grid exposure control in which an image sensor array is divided into a plurality of sub-arrays (or sub-units), and each of the sub-arrays may be controlled with a different exposure time or set(s) of exposure times, independent of other sub-arrays in the image sensor array. The exposure times or set(s) of exposure times may be assigned to particular sub-arrays according to a requisite dynamic range of a scene to be captured.

One or more example embodiments provides image sensors including image sensor arrays, wherein the pixels of an image sensor array are divided (or grouped) into a plurality of sub-arrays (or sub units), and wherein different exposure times, or sets of exposure times, are applied to different sub-arrays. The exposure times or set(s) of exposure times may be assigned to particular sub-arrays according to requisite dynamic ranges of scenes to be captured.

According to at least some example embodiments, a timing circuit may calculate and set an exposure time (or set of exposure times or sets of exposure times) for each sub-array of pixels independently of at least some of the other sub-arrays of pixels such that the sub-arrays are assigned different and/or independent exposure times (or sets of exposure times). One or more example embodiments may provide images having higher dynamic ranges since areas of the pixel array may be calibrated to have a more appropriate exposure time(s) based on the portion of the scene being captured by that particular portion of the image sensor.

One or more example embodiments may be implemented in conjunction with active pixel sensor (APS) arrays for complementary-metal-oxide-semiconductor (CMOS) image sensors. The APS arrays may utilize a stack image sensor structure in which a pixel array is located on a top side of a substrate, and corresponding control circuitry is located on the bottom side of the substrate. The control circuitry may include a plurality of control circuits, wherein at least one of the plurality of control circuits corresponds to a sub-array of the pixel array. In at least one example embodiment, each of the plurality of control circuits corresponds to a sub-array of the pixel array. However, example embodiments are not limited to this example.

FIG. 1 is a block diagram of an image sensor 1000 according to an example embodiment. In the example shown in FIG. 1, the image sensor 1000 is a CMOS image sensor. However, example embodiments should not be limited to this example.

Referring to FIG. 1, the image sensor 1000 includes: a timing circuit 106; a line driver 102; a pixel array 100; an analog-to-digital converter (ADC) 104; and an image processing circuit 108.

The timing circuit 106 controls the line driver 102 through one or more control lines CL. In one example, the timing circuit 106 causes the line driver 102 to generate a plurality of transfer pulses (e.g., reset/shutter, sampling, readout, and/or selection) to control exposure and readout of the active pixel sensors (also sometimes referred to herein as pixels or pixel sensors) in the pixel array 100. As will be discussed in more detail below, according to at least some example embodiments, the timing circuit 106 calculates and sets an exposure time (or set of exposure times or sets of exposure times) for each sub-array of the pixel array 100 independently of at least some others of the sub-arrays of the pixel array 100 such that at least some of the sub-arrays are assigned different (and independent) exposure times or sets of exposure times.

Still referring to FIG. 1, the line driver 102 outputs transfer pulses to control circuitry of the pixel array 100 over a plurality of read and reset lines RRL. The read and reset lines RRL may include transfer lines, sampling lines, reset lines, and selection lines.

The pixel array 100 includes a plurality of pixels arranged in an array of rows ROW_0, ..., ROW_i, ..., ROW_N−1 and columns COL_0, ..., COL_i, ..., COL_N−1. As discussed herein, rows and columns may be collectively referred to as lines. Each of the plurality of read and reset lines RRL corresponds to a line of pixels in the pixel array 100 having, for example, a Bayer color pattern. In the example embodiment shown in FIG. 1, each pixel is an active-pixel sensor (APS), and the pixel array 100 is an APS array. However, example embodiments should not be limited to this example.

The pixel array 100 outputs pixel data (e.g., voltages) from each line of the pixel array 100 to the ADC 104 during respective readout periods.

The ADC 104 converts the output pixel data (e.g., voltages) from each line of readout pixels into a digital signal (also sometimes referred to herein as image data). The ADC 104 outputs the image data $D_{OUT}$ to the image processing circuit 108.

The image processing circuit 108 performs further processing to generate an image. The generated image may be displayed on a display device (e.g., monitor, etc.) and/or stored in a memory (not shown). The display device and/or the memory may be coupled to the image processing circuit 108.

The image sensor 1000 may expose the pixels in the pixel array 100 using a global shutter or a rolling shutter. As is known, global shutter is a method of image capture in which a snapshot of an entire scene is taken by applying transfer pulses to the pixels concurrently. On the other hand, rolling shutter is a method for image capture in which transfer pulses are applied sequentially to lines of pixels that are scanned rapidly either vertically or horizontally.

According to at least some example embodiments, the image sensor shown in FIG. 1 may have a stack structure in which the APS array 100 is arranged on a top side of a wafer or substrate, and coupled to the control circuitry arranged on a bottom side of the wafer or substrate. In at least one example embodiment, the control circuitry may include a plurality control circuits, wherein at least one of the plurality of control circuits corresponds to a group of pixel sensors in the APS array 100. In one example, each of the plurality of control circuits may correspond to a group of pixel sensors in the APS array 100.

According to at least some example embodiments, each of the plurality of control circuits includes at least one transfer gate controller, which controls application of reset and readout transfer pulses to pixels in the pixel array 100. The application of a reset transfer pulse to a pixel initiates the exposure time (or period) for that pixel, and the application of a readout transfer pulse ends the exposure time (or period) for that particular pixel. Thus, the plurality of control circuits control the moment at which an exposure time for a given pixel begins and ends. Each of the plurality of control circuits controls application of the reset and readout transfer pulses by controlling opening and closing of pixel transfer gates for pixels of the pixel array 100. Because this circuitry is generally well-known, a further detailed discussion is omitted.

Figure 2:
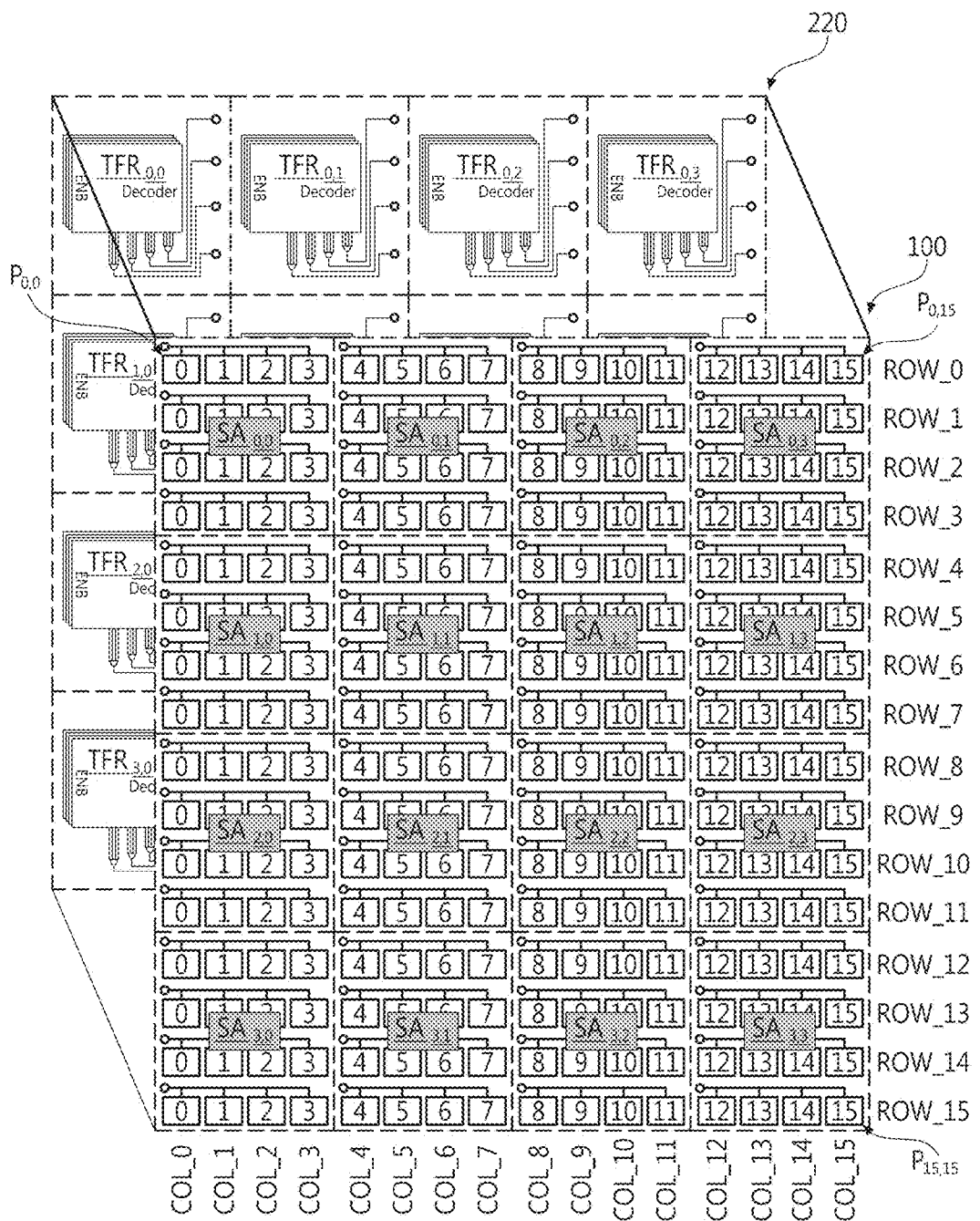
FIG. 2 illustrates a more detailed example of the active pixel sensor (APS) array 100 shown in FIG. 1.

FIG. 2 illustrates a more detailed example of the pixel array 100 shown in FIG. 1 along with corresponding control circuitry 220.

Referring to FIG. 2, in this example the pixel array 100 is a 16×16 array of active pixel sensors including 16 rows ROW_0 through ROW_15 and 16 columns COL_0 through COL_15 of active pixel sensors. Accordingly, FIG. 2 illustrates the pixel array 100 shown in FIG. 1 where N is 16. However, example embodiments are not limited to this example. Rather, the pixel array 100 may have any number of active pixel sensors.

In the example shown in FIG. 2, each active pixel sensor P is identified with regard to a row index i and column index j in the pixel array 100. Accordingly, the upper left most pixel in the APS array may be referred to as pixel $P_{0,0}$, the upper right most pixel in the APS array may be referred to as pixel $P_{0,15}$, and the lower right most pixel may be referred to as pixel $P_{15,15}$. More generically, a given pixel in the pixel array shown in FIG. 2 may be referred to as pixel $P_{i,j}$.

In the example shown in FIG. 2, the active pixel sensors in the APS array 100 are divided (or grouped) into sub-arrays of 4×4 pixels (also referred to as sub-units).

Each sub-array of active pixel sensors is identified with regard to a row index m and column index n. Accordingly, the upper left most sub-array is referred to as sub-array $SA_{0,0}$, the upper right most sub-array is referred to as sub-array $SA_{0,3}$, and the lower right most sub-array is referred to as sub-array $SA_{3,3}$. More generically, a given sub-array in FIG. 2 is referred to as sub-array $SA_{m,n}$. In the specific example shown in FIG. 2, the pixel array 100 is divided into 16 sub-arrays.

Still referring to FIG. 2, a first row of the sub-arrays includes sub-arrays $SA_{0,0}$, $SA_{0,1}$, $SA_{0,2}$, $SA_{0,3}$; a second row of sub-arrays includes sub-arrays $SA_{1,0}$, $SA_{1,1}$, $SA_{1,2}$, $SA_{1,3}$; a third row of sub-arrays includes sub-arrays $SA_{2,0}$, $SA_{2,1}$, $SA_{2,2}$, $SA_{2,3}$; and a fourth row of sub-arrays includes sub-arrays $SA_{3,0}$, $SA_{3,1}$, $SA_{3,2}$, and $SA_{3,3}$. The rows of sub-arrays may also be referred to as horizontal strips of sub-arrays, where each horizontal strip has a fixed row size of pixels (e.g., 4 rows, ROW_0-ROW_3, ROW_4-ROW_7, ROW_8-ROW_11, and ROW_12-ROW_15).

Similarly, a first column of sub-arrays includes sub-arrays $SA_{0,0}$, $SA_{1,0}$, $SA_{2,0}$, $SA_{3,0}$; a second column of sub-arrays includes sub-arrays $SA_{0,1}$, $SA_{1,1}$, $SA_{2,1}$, $SA_{3,1}$; a third column of sub-arrays includes sub-arrays $SA_{0,2}$, $SA_{1,2}$, $SA_{2,2}$, $SA_{3,2}$; and a fourth column of sub-arrays includes sub-arrays $SA_{0,3}$, $SA_{1,3}$, $SA_{2,3}$, and $SA_{3,3}$. The columns of sub-arrays may also be referred to as vertical strips of sub-arrays. In this example, each vertical strip has fixed column size of pixels (e.g., 4 columns, COL_0-COL_3, COL_4-COL_7, COL_8-COL_11, and COL_12-COL_15).

Still referring to FIG. 2, the control circuitry 220 is positioned below the pixel array 100, and includes a plurality of control circuits $TFR_{m,n}$, where m and n correspond to the same row and column index used to identify the sub-arrays $SA_{m,n}$. In the example embodiment shown in FIG. 2, each of the plurality of control circuits $TFR_{m,n}$ corresponds to a sub-array of active pixel sensors of the pixel array 100. As discussed above, each of the plurality of control circuits $TFR_{m,n}$ includes a transfer gate controller. The transfer gate controller controls the times at which a pixel transfer gate opens and closes, thereby controlling the moment at which an exposure time for each sub-array begins and ends.

Although FIG. 2 illustrates an example embodiment in which each of the plurality of control circuits $TFR_{m,n}$ corresponds to a sub-array of active pixel sensors of the pixel array 100, example embodiments are not limited to this example. Rather, two or more control circuits may correspond to each sub-array of active pixel sensors 100 such that multiple sets of exposures may be applied for long and short pixels within each sub-array. In one example, two control circuits may correspond to each of the sub-arrays such that two sets of exposures for long and short pixels may be applied to each sub-array. In another alternative, a control circuit may be provided for each pixel in the pixel array.

In more detail with regard to the example embodiment shown in FIG. 2, each of the plurality of control circuits $TFR_{m,n}$ is electrically coupled to active pixel sensors in a corresponding sub-array of the pixel array 100 such that each control circuit $TFR_{m,n}$ applies transfer pulses to active pixel sensors in the corresponding sub-array $SA_{m,n}$ of the pixel array 100. For example, control circuit $TFR_{0,0}$ is coupled to rows ROW_0, ROW_1, ROW_2, and ROW_3 in sub-array $SA_{0,0}$, such that the control circuit $TFR_{0,0}$ applies transfer pulses to the active pixel sensors $P_{0,0}$ through $P_{0,3}$ in ROW_0, $P_{1,0}$ through $P_{1,3}$ in ROW_1, $P_{2,0}$ through $P_{2,3}$ in ROW_2, and $P_{3,0}$ through $P_{3,3}$ in ROW_3 of the APS array 100.

An example embodiment will now be described with regard to FIGS. 1 and 2.

In example operation, when a rolling shutter is applied for each line of a pixel array, the timing circuit 106 independently identifies vertical strips in a particular row to which pixel reset activation for a given exposure time should be applied. In one example, for row ROW_0 only pixels $P_{0,0}$ through $P_{0,3}$ in sub-array $SA_{0,0}$ (the first, left-most vertical strip) and pixels $P_{0,12}$ through $P_{0,15}$ in sub-array $SA_{0,3}$ (the fourth, right-most vertical strip) may be activated, while pixels $P_{0,4}$ through $P_{0,11}$ in sub-arrays $SA_{0,1}$ and $SA_{0,2}$ (the middle two vertical strips) are activated with different pixel reset pulses to affect different exposure times.

In this example, all of the pixels in a sub-array of the APS array are eventually exposed with one of 4 different exposure times.

According to at least some example embodiments, the timing circuit 106 calculates (or assigns) at least one exposure time for each entire sub-array $SA_{m,n}$ of the APS array 100 based on a portion of the scene being captured by a respective sub-array $SA_{m,n}$ of the APS array. In this regard, exposure times for active sensor pixels in one or more of the sub-arrays may be different and/or independent of exposure times for active pixel sensors in others of the sub-arrays. An exposure time may also be referred to as a length of the exposure period for an active pixel sensor. Although discussed above with regard to 4 exposure times, example embodiments are not limited to this example. Rather, according to at least some example embodiments, one or more sets of exposure times may be assigned to each sub-array. In one example, each set of exposure times may include a single exposure time, 2 exposure times, 4 exposure times, or greater than 4 exposure times. Moreover, the number of different lengths of exposure periods may increase depending on image sensor requirements. According to at least some example embodiments, as mentioned above, sets of a plurality of long exposure times and a plurality of short exposure times may be applied to the same sub-array. An example manner in which a set of exposure times may be assigned to a particular sub-array will be discussed in more detail later.

Figure 3:
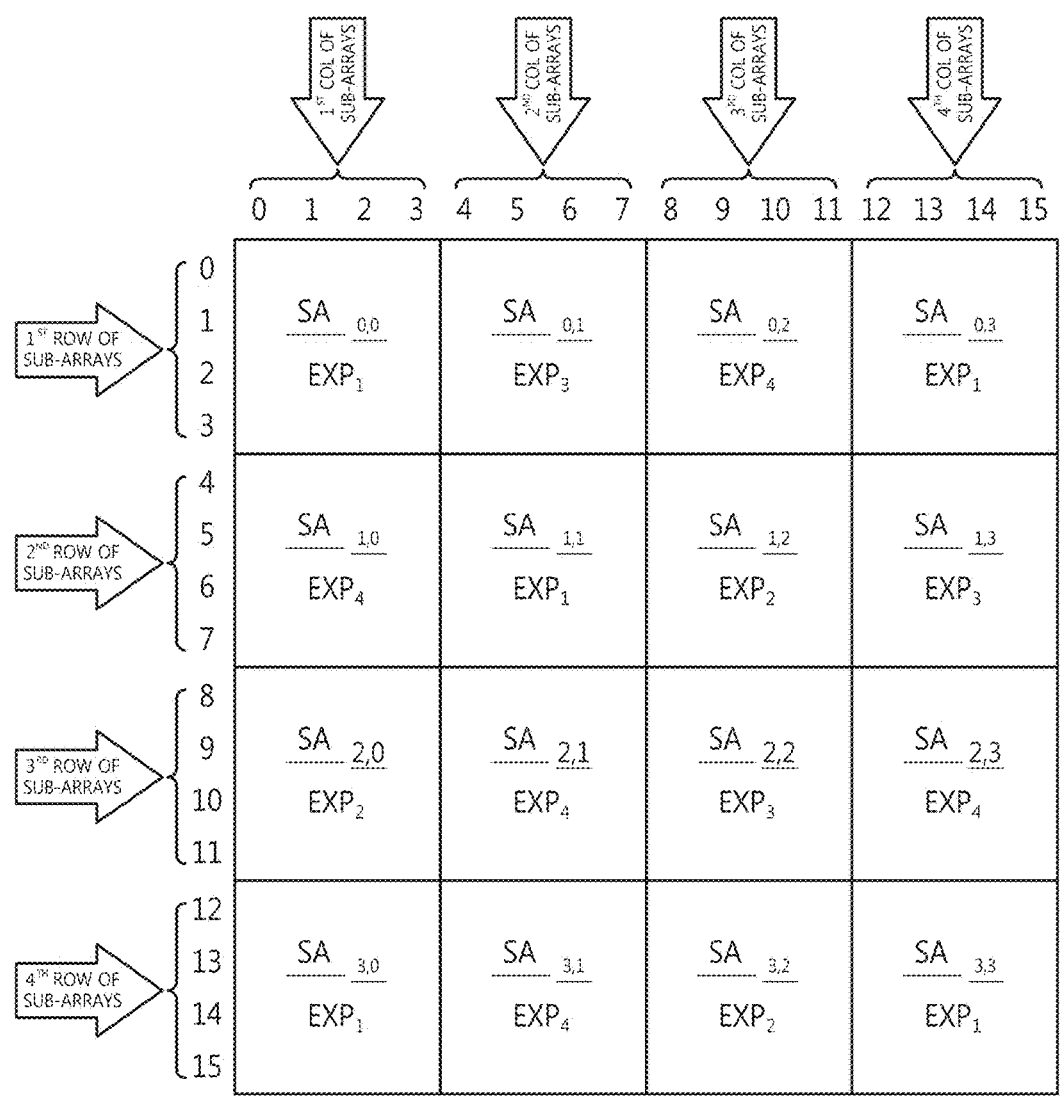
FIG. 3 illustrates an example configuration of different exposure periods for the 16×16 APS array shown in FIG. 2.

FIG. 3 illustrates an example configuration of different exposure periods for a 16×16 APS array, such as the example shown in FIG. 2.

Referring to FIG. 3, when applying a rolling shutter to capture an image, the line driver 102 selectively applies shutter transfer pulses to pixels in a given row of sub-arrays such that pixels in different sub-arrays have different exposure times.

With specific regard to the first row of sub-arrays shown in FIG. 3, pixels in sub-arrays $SA_{0,0}$ and $SA_{0,3}$ (first and fourth vertical strips of sub-arrays) are exposed for a first exposure period $EXP_1$, while the pixels in sub-arrays $SA_{0,1}$ and $SA_{0,2}$ (second and third vertical strips of sub-arrays) are exposed for exposure times $EXP_3$ and $EXP_4$, which are different from the first exposure time $EXP_1$. Accordingly, the exposure times for the pixels in sub-arrays $SA_{0,0}$ and $SA_{0,3}$ are different from the exposure times for pixels in sub-arrays $SA_{0,1}$ and $SA_{0,2}$.

At rows ROW_4 through ROW_7 (also referred to as the second row of sub-arrays), the exposure time $EXP_4$ is applied only to pixels in sub-array $SA_{1,0}$, the exposure time $EXP_1$ is applied only to pixels in sub-array $SA_{1,1}$, the exposure time $EXP_2$ is applied only to pixels in sub-array $SA_{1,2}$, and the exposure time $EXP_3$ is applied only to pixels in sub-array $SA_{1,3}$. In this example, pixels in each of the sub-arrays in the second row of sub-arrays have a different exposure time.

Eventually, as shown in FIG. 3, the entire array is exposed with one of 4 different exposure times, which are selectively applied to different sub-arrays of the APS array. In this example, the exposure times are applied on a per-sub-array basis. According to one or more example embodiments, the exposure times may be applied to different sub-arrays based on dynamic ranges of portions of a scene corresponding to the sub-arrays.

FIG. 4 illustrates a simplified example in which a pixel array is divided into sub-arrays of 32×32 pixels. The pixel array includes an array of 10×10 sub-arrays. In this example, the exposure time $EXP_1$ is applied to the pixels in the sub-arrays labeled $EXP_1$, the exposure time $EXP_2$ is applied to the pixels in the sub-arrays labeled $EXP_2$, the exposure time $EXP_3$ is applied to the pixels in the sub-arrays labeled $EXP_3$, and the exposure time $EXP_4$ is applied to the pixels in the sub-arrays labeled $EXP_4$. For the sub-arrays labeled COMB in FIG. 4, one of a long exposure time and a short exposure time may be applied to pixels of the sub-array. The exposure times applied to the sub-arrays labeled COMB in FIG. 4 may be set based on the exposure for the neighboring sub unit. For example, if exposure time $EXP_1$ denotes a short exposure time (e.g., 2 or 4 milliseconds (ms)) and exposure time $EXP_3$ denotes a long exposure time (e.g., 16 or 32 ms), then at sub-array 402 the exposure time $EXP_1$ is applied to short pixels in the sub-array, and the shutter $EXP_3$ is applied to the long pixels in the sub-array. Accordingly, a combination of the exposure times applied at each neighboring sub-array is applied to the pixels of the sub-array 402. The multiple exposure times may be determined and applied to a sub-array, such as sub-array 402, as discussed in more detail later with regard to FIGS. 5-7.

The timing circuit 106 may control the exposure times (or shutter signals) applied to different portions of the APS array based on brightness (or dynamic range) of corresponding portions of a scene being captured. The brightness of the corresponding portions of the scene may be determined based on data obtained from a previous (e.g., most recent) frame of a captured image of the scene. If there is no data from a previous frame available, then the exposure times may be set to a configurable default value. The configurable default value may be set by a user according to experimental/empirical data. Examples for determining brightness and exposure times will be discussed in more detail later with regard to FIGS. 5-7.

According to at least some example embodiments, exposure control of the APS array provides the flexibility of using different exposure durations for different sub-arrays in an APS array.

Figure 5:
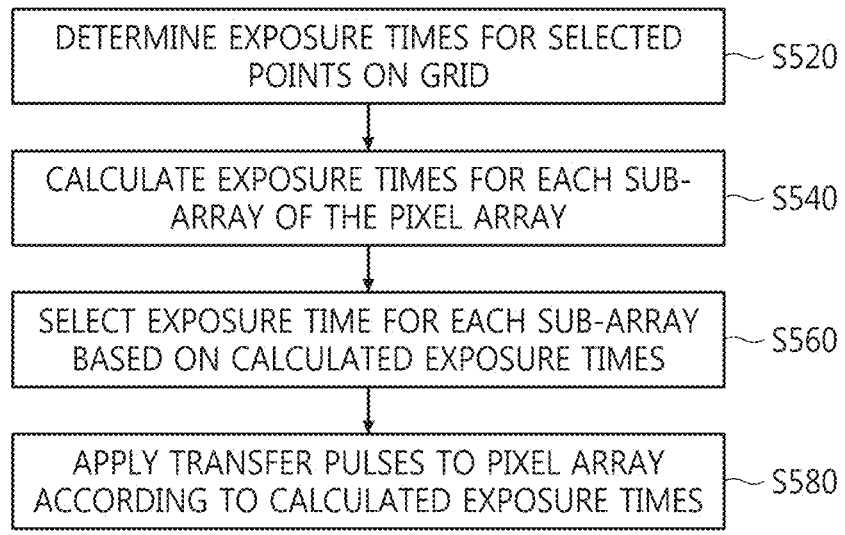
FIG. 5 is a flow chart illustrating an example embodiment of a method for controlling exposure times for a pixel array.

FIG. 5 is a flow chart illustrating an example embodiment of a method for controlling exposure times (or shutters) for a pixel array. For example purposes, the example embodiment shown in FIG. 5 will be described with regard to the image sensor 1000 shown in FIG. 1 and the pixel array 100 shown in FIG. 2. Moreover, the example embodiment shown in FIG. 5 will be discussed with regard to a wide dynamic range (WDR) image sensor in which a set of long and short exposure times may be applied to each sub-array. However, example embodiments should not be limited to this example.

Referring to FIG. 5, at S520 the timing circuit 106 determines a set of long and short exposure times for each selected point on an image grid corresponding to the scene to be captured in a next frame. The grid points may be set by a user according to the image of the scene to be captured and/or other empirical or experimental results. The grid points may be spaced apart from one another at regular or uniform intervals on the image grid.

The timing circuit 106 determines the long and short exposure time for each of the selected points on the grid based on data from a previous frame. In one example, the data from a previous frame refers to histograms of an image of the scene for frame n on each sub-array of the APS array. As mentioned above, if there is no data from a previous frame available, then the long and short exposure time for each of the selected points on the grid are determined based on a configurable default value.

In more detail, for example, if the data around a given point of the grid is mostly bright, then the long and short exposure times for the particular point on the grid should be relatively short (e.g., 4 ms and 2 ms, respectively). If the data around a given point on the grid is mostly dark, then the long and short exposure times should be relatively long (e.g., 32 ms and 8 ms, respectively). If the data around a given point of the grid has a relatively high dynamic range, then the long exposure time should be relatively long (e.g., 32 ms) and the short exposure time should be relatively short (e.g., 2 ms).

In one example, a hardware (HW) block (not shown) collects histograms of the image for frame n on each sub-array of the APS array. Based on the collected histograms, the timing circuit 106 calculates exposure times for selected points on grid. Then, for frame n+1 for each sub-array, the timing circuit 106 sets a short exposure time to capture the brighter parts of the sub-array, and sets a long exposure time to capture the darker parts of the sub-array as indicated by the collected histograms. As is known, a HW block may be implemented in a digital processing part of the image sensor, an image signal processor, etc. In at least one example, the HW block may be generalization of the well-known histogram collection for auto-exposure.

Still referring to FIG. 5, at S540 the timing circuit 106 calculates exposure times (e.g., a long exposure time and a short exposure time) for each sub-array of the pixel array 100. In more detail, the timing circuit 106 calculates a long exposure time and a short exposure time for each sub-array by linear interpolation of the values of the exposure times at the nearest grid points, rounded to the nearest exposure time of the image sensor.

Operations S520 and S540 will be discussed in more detail later with regard to FIGS. 6 and 7.

Still referring to FIG. 5, at S560 the timing circuit 106 selects at least one exposure time for each of the sub-arrays from the set of exposure times calculated at S540. The timing circuit 106 then outputs the selected exposure time(s) to the line driver 102.

At S580, in response to receiving the selected exposure times from the timing circuit 106, the line driver 102 applies the selected exposure times to the appropriate sub-arrays of the pixel array 100. Because exposure of pixels according to signals from a line driver, such as line driver 102, are generally well-known, a further detailed discussion is omitted.

Figure 6:
FIG. 6 is an example of a captured image of a scene for explaining operations S520-S560 shown in FIG. 5.

FIG. 6 is an example of a captured image of a scene for explaining operations S520-S560 shown in FIG. 5. FIG. 7 illustrates a grid corresponding to an array of 16×16 sub-arrays for explaining operations S520-S560 for the captured image shown in FIG. 6.

Figure 7:
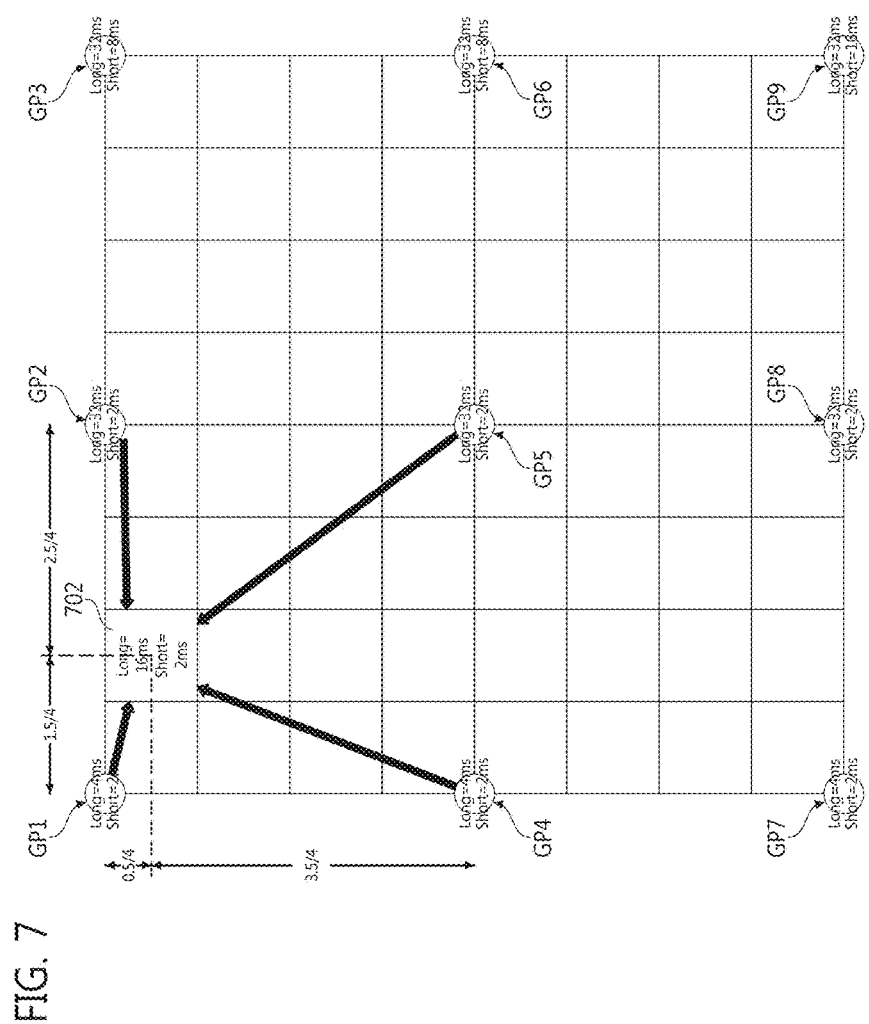
FIG. 7 illustrates a grid corresponding to an array of 16×16 sub-arrays for explaining operations S520-S560 for the captured image shown in FIG. 6.

Referring to FIGS. 6 and 7, each of the selected points GP1 through GP9 on the grid is denoted by a circle. These grid points correspond to examples of the selected points discussed above with regard to FIG. 5.

As shown in FIG. 6, the portions of the scene around grid points GP1, GP4 and GP7 are mostly bright. As a result, the timing circuit 106 sets the long and short exposure times for each of these grid points to relatively short durations. In this example, the timing circuit 106 sets the long exposure time for each of grid points GP1, GP4 and GP7 to about 4 ms, and sets the short exposure time for these grid points to about 2 ms.

By contrast, the portions of the image around grid points GP2, GP5 and GP8 in the middle of the image have relatively high dynamic ranges; that is, for example, portions of the image around these grid points are relatively dark, whereas other portions of the image around these grid points are relatively bright. Since the portions of the image around these grid points have relatively high dynamic ranges, the timing circuit 106 sets the long exposure time for each of the grid points to a relatively long duration, and sets the short exposure time to a relatively short duration. In this example, the long exposure time is set to about 32 ms, whereas the short exposure time is set to about 2 ms.

The portions of the scene around grid points GP3, GP6 and GP9 are mostly dark. As a result, the timing circuit 106 sets the long and short exposure times for each of these grid points to relatively long durations. In this example, the timing circuit 106 sets the long exposure time for each of grid points GP3 and GP6 to about 32 ms, and the short exposure time for these grid points to about 8 ms. The timing circuit 106 sets the long exposure time for grid point GP9 to about 32 ms, and the short exposure time for this grid point to about 16 ms Referring to FIG. 7, after calculating exposure times for each of the selected points on the grid (e.g., S520), the timing circuit 106 calculates a set of exposure times (e.g., including a long exposure time and a short exposure time) for each of the sub-arrays of the APS array based on the calculated exposure times using linear interpolation (e.g., S540, S560). In more detail, the timing circuit 106 performs linear interpolation using the exposure times for the selected grid points to calculate a set of exposure times (e.g., a short exposure time and a long exposure time) for each sub array of the 16×16 array. The timing circuit 106 then rounds the calculated exposure times to a nearest exposure time from among exposure times of the image sensor (e.g., 32 ms, 16 ms, 8 ms, 4 ms, 2 ms).

According to at least one example embodiment, the timing circuit 106 calculates the long exposure time for a sub-array based on a distance between the center of the sub-array and the GP points surrounding the sub-array.

For example, with regard to FIG. 7, the horizontal distance between the center of sub-array 702 and GP1 is 1.5 times the size of a sub-array, and the vertical distance between the center of sub-array 702 and GP1 is 0.5 times the size of a sub-array. The horizontal distance between the center of sub-array 702 and GP2 is 2.5 times the size of a sub-array, and the vertical distance between the center of sub-array 702 and GP2 is 0.5 times the size of a sub-array. The horizontal distance between the center of sub-array 702 and GP4 is 1.5 times the size of a sub-array, and the vertical distance between the center of sub-array 702 and GP4 is 3.5 times the size of a sub-array. The horizontal distance between the center of sub-array 702 and GP5 is 2.5 times the size of a sub-array, and the vertical distance between the center of sub-array 702 and GP5 is 3.5 times the size of a sub-array. Accordingly, in this example, the long exposure for the sub-array 702 may be calculated as shown below:

$$\frac{((0.5*1.5*4) + (0.5*2.5*32) + (3.5*1.5*4) + (3.5*2.5*32))}{16} = 21.5.$$

In this example, the timing circuit 106 then sets the long exposure time for the sub-array 702 to 16 ms.

Similarly, the short exposure for the sub-array 702 may be calculated as shown below:

$$\frac{((0.5*1.5*2) + (0.5*2.5*2) + (3.5*1.5*2) + (3.5*2.5*2))}{16} = 2.$$

In this case, the timing circuit 106 then sets the short exposure time for the sub-array 702 to 2 ms.

According to one or more example embodiments, the weights used in the interpolation are not limited to those necessary for bi-linear interpolation. Rather, the weights may be any decreasing weights of the distance between the grid points and the center of a given sub-array. In one example, Gaussian weights may be used. For example, the weight associated with grid point GP1 may be given by $$e^{\left(\frac{-dist(GP1,702)^2}{2\sigma^2}\right)}.$$

In this example, dist is the Euclidian distance, and $\sigma$ is a user defined smoothing parameter. The user defined smooth parameter $\sigma$ may be chosen according to experimental results and/or empirical data.

The timing circuit 106 calculates sets of exposure times for each of the sub-arrays in the pixel array using linear interpolation in the same or substantially the same manner as discussed above.

According to at least some example embodiments, the exposure time or set(s) of exposure times for each sub-array may be one of a plurality of options per exposure type (e.g., short or long exposure types). For example, the plurality of exposure times for the short exposure type (short exposure time) may be 2 ms, 4 ms, 8 ms and 16 ms, whereas the plurality of exposure times for the long exposure type (long exposure time) may be 4, ms, 8 ms, 16 ms, and 32 ms.

Figure 10:
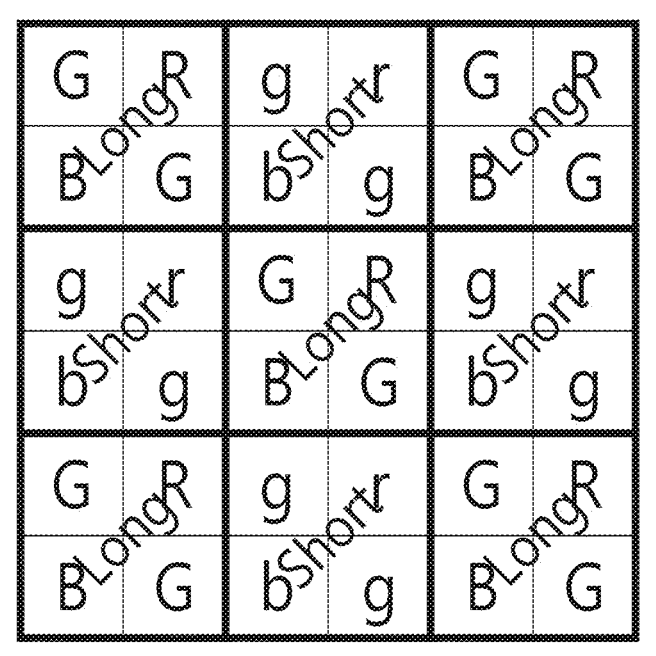

According to one or more example embodiments, the exposure times may be applied in accordance with known methods such as those discussed above with regard to FIGS. 9 and 10.

If a pixel array is divided into, for example, quarters (e.g., in the case of WDR), then the timing circuit 106 may set two exposure times for each quarter. In this example, the timing circuit 106 may set one exposure time for long exposure, and one exposure time for short exposure.

In this case, the pixel array may be divided into sub areas in which exposure times are set to the same value for long and short pixels, and other areas at borders of the sub-arrays where long and short exposure times are set differently according to exposure types of neighboring pixels and/or sub-arrays.

Further, to maintain wide-dynamic range (WDR) mosaic capability, at least 2 sets of 4 different durations of exposure periods may be used. A first set of exposure periods may include a set of longer length exposure periods for long integration times, whereas a second set of exposure periods may include a set of shorter length exposure periods for short integration times.

According to at least some example embodiments, the technology of grid array exposure control provides the flexibility of using different exposure durations for different sub-arrays of a pixel array. According to at least some example embodiments, when a rolling shutter is applied for each line, an independent decision about application of a pixel reset activation signal to strips in a specific line may be made. For example, referring back to FIG. 3, for a first reset shutter, for the first row of sub-arrays, only first and last vertical columns (or strips) of a sub-array may be activated, while middle columns (or strips) of the sub-array may be activated with a different exposure time.

Eventually, each of the pixels in the pixel array is exposed with one of a plurality of (e.g., 4) different exposure times, which can be applied to different areas, under the limitation of fixed vertical strip size.

Figure 8:
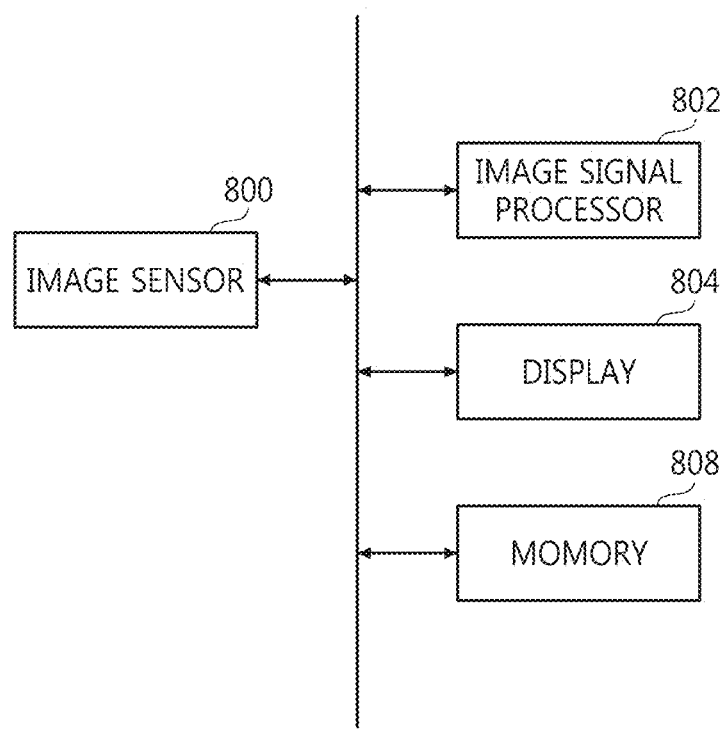
FIG. 8 is a block diagram illustrating an electronic imaging system according to an example embodiment.

FIG. 8 is a block diagram illustrating an electronic imaging system according to an example embodiment.

Referring to FIG. 8, the electronic imaging system includes: an image sensor 800; an image signal processor (ISP) 802; a display 804; and a memory 808. The image sensor 800, the ISP 802, the display 804 and the memory 808 communicate with one another via a bus 806.

The image sensor 800 may be an image sensor according to example embodiments described herein. The image sensor 800 is configured to capture image data by converting optical images into electrical signals. The electrical signals are output to the ISP 802.

The ISP 802 processes the captured image data for storage in the memory 808 and/or display by the display 804. In more detail, the ISP 802 is configured to: receive digital image data from the image sensor 800; perform image processing operations on the digital image data; and output a processed image or processed image data. The ISP 802 may be or include the image processing circuit 108 shown in FIG. 1.

The ISP 802 may also be configured to execute a program and control the electronic imaging system. The program code to be executed by the ISP 802 may be stored in the memory 808. The memory 808 may also store the image data and/or images acquired by the image sensor and processed by the ISP 802. The memory 808 may be any suitable volatile or non-volatile memory.

The electronic imaging system shown in FIG. 8 may be connected to an external device (e.g., a personal computer or a network) through an input/output device (not shown) and may exchange data with the external device.

The electronic imaging system shown in FIG. 8 may embody various electronic control systems including an image sensor, such as a digital still camera. Moreover, the electronic imaging system may be used in, for example, mobile phones, personal digital assistants (PDAs), laptop computers, netbooks, MP3 players, navigation devices, household appliances, or any other device utilizing an image sensor or similar device.

The foregoing description of example embodiments has been provided for purposes of illustration and description. It is not intended to be exhaustive or limiting. Individual elements or features of a particular example embodiment are generally not limited to that particular example embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. An image sensor comprising:
a pixel array including a plurality of sub-arrays arranged in a plurality of rows and columns, each of the plurality of sub-arrays including a plurality of pixels; and
a plurality of control circuits coupled to the pixel array, the plurality of control circuits being configured to control exposure of the plurality of sub-arrays, wherein
at least a first of the plurality of control circuits is configured to control exposure of a first of the plurality of sub-arrays according to a first set of exposure times,
at least a second of the plurality of control circuits is configured to control exposure of a second of the plurality of sub-arrays according to a second set of exposure times,
the first set of exposure times is different from the second set of exposure times,
the first set of exposure times is based on weighted values of established exposure times among an established set of established exposure times for a plurality of grid points on the pixel array,
the established exposure times among the established set of established exposure times are established according to a dynamic range of a corresponding portion of a scene to be captured by the first of the plurality of sub-arrays, and
the weighted values of the established exposure times among the established set of established exposure times are weighted based on distances between a center of the first of the plurality of sub-arrays and each of the plurality of grid points.

2. The image sensor of claim 1, wherein at least the first of the plurality of control circuits is configured to control the first of the plurality of sub-arrays independently of the second of the plurality of sub-arrays and others of the plurality of sub-arrays.

3. The image sensor of claim 1, further comprising:
a timing circuit configured to
establish the established set of established exposure times for the plurality of grid points on the pixel array according to the dynamic range of the corresponding portion of the scene to be captured by the first of the plurality of sub-arrays; and
calculate the first set of exposure times based on the weighted values of the established exposure times among the established set of established exposure times for the plurality of grid points.

4. The image sensor of claim 3, wherein the first set of exposure times includes
a first subset of exposure times for short exposure pixels among the plurality of pixels of the first of the plurality of sub-arrays; and
a second subset of exposure times for long exposure pixels among the plurality of pixels of the first of the plurality of sub-arrays.

5. The image sensor of claim 4, wherein the first of the plurality of control circuits is configured to
control exposure of a first portion of the plurality of pixels of the first of the plurality of sub-arrays according to the first subset of exposure times; and
control exposure of a second portion of the plurality of pixels of the first of the plurality of sub-arrays according to the second subset of exposure times.

6. The image sensor of claim 3, wherein the established exposure times among the established set of established exposure times include a long exposure time and a short exposure time.

7. The image sensor of claim 3, wherein the plurality of grid points are spaced apart from one another at regular intervals on the pixel array.

8. The image sensor of claim 3, wherein the timing circuit is further configured to calculate the first set of exposure times using interpolation.

9. The image sensor of claim 8, wherein the interpolation is linear interpolation.

10. The image sensor of claim 1, further comprising:
a line driver configured to generate a plurality of transfer pulses according to the first set of exposure times, the plurality of transfer pulses controlling exposure of the first of the plurality of sub-arrays.

11. A digital imaging system comprising:
a processor configured to execute computer-readable instructions to process captured image data; and
the image sensor of claim 1 configured to capture the captured image data by converting optical images into electrical signals.

12. An image sensor comprising:
a pixel array including a plurality of sub-arrays arranged in a plurality of rows and columns, each of the plurality of sub-arrays including a plurality of pixels, and each of the plurality of sub-arrays corresponding to a portion of a scene to be captured by the image sensor; and
a timing circuit configured to
establish a set of established exposure times for each of a plurality of grid points on the pixel array according to a first dynamic range of a first portion of the scene to be captured by a first of the plurality of sub-arrays,
generate a first set of exposure times for the first of the plurality of sub-arrays based on weighted values of established exposure times among the set of established exposure times, the weighted values of the established exposure times weighted based on distances between a center of the first of the plurality of sub-arrays and each of the plurality of grid points, and generate a second set of exposure times for a second of the plurality of sub-arrays based on a second dynamic range of a second portion of the scene to be captured by the second of the plurality of sub-arrays, the second set of exposure times different from the first set of exposure times.

13. The image sensor of claim 12, wherein the first set of exposure times includes
   a first subset of exposure times for short exposure pixels among the plurality of pixels of the first of the plurality of sub-arrays; and
   a second subset of exposure times for long exposure pixels among the plurality of pixels of the first of the plurality of sub-arrays.

14. The image sensor of claim 12, wherein the timing circuit is further configured to generate the first set of exposure times for the first of the plurality of sub-arrays based on the weighted values of the established exposure times among the established set of exposure times using interpolation.

* * * * *